US010752239B2

(12) United States Patent
Duan et al.

(10) Patent No.: US 10,752,239 B2
(45) Date of Patent: Aug. 25, 2020

(54) TRAINING A SELF-DRIVING VEHICLE

(71) Applicant: International Business Machines Corporation, Armonk, NY (US)

(72) Inventors: Ning Duan, Beijing (CN); Guoqiang Hu, Shanghai (CN); Jing Chang Huang, Shanghai (CN); Junchi Yan, Shanghai (CN); Jun Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 377 days.

(21) Appl. No.: 15/439,251

(22) Filed: Feb. 22, 2017

(65) Prior Publication Data

US 2018/0237005 A1 Aug. 23, 2018

(51) Int. Cl.
*B60W 30/09* (2012.01)
*G05D 1/00* (2006.01)
*G05D 1/02* (2020.01)
*G08G 1/16* (2006.01)
*B62D 15/02* (2006.01)
(Continued)

(52) U.S. Cl.
CPC .......... *B60W 30/09* (2013.01); *B60W 30/085* (2013.01); *B62D 15/025* (2013.01); *B62D 15/0265* (2013.01); *B60W 2040/0881* (2013.01); *B60W 2530/10* (2013.01); *B60W 2554/00* (2020.02); *G08G 1/166* (2013.01)

(58) Field of Classification Search
CPC ...... B60W 30/09; B60W 30/08; G08G 1/166; G05D 1/0289; G05D 1/0221; G05D 1/0214; G05D 1/0088
See application file for complete search history.

(56) References Cited

U.S. PATENT DOCUMENTS 8,849,501 B2 9/2014 Cook et al.
9,102,220 B2* 8/2015 Breed ................. B60R 21/0132
9,311,271 B2 4/2016 Wright et al.
(Continued)

FOREIGN PATENT DOCUMENTS

CN 104590274 A 5/2015
CN 105892471 A 8/2016
CN 106347359 A 1/2017

OTHER PUBLICATIONS

P. Mell et al., "The NIST Definition of Cloud Computing", National Institute of Standards and Technology, Information Technology Laboratory, Sep. 2011, pp. 1-7.
(Continued)

*Primary Examiner* — Hunter B Lonsberry
*Assistant Examiner* — Mathew Franklin Gordon
(74) *Attorney, Agent, or Firm* — Law Office of Jim Boice

(57) ABSTRACT

One or more sensors associated with a vehicle detect a roadway condition of a first roadway and an evasive maneuver is performed by the vehicle to avoid the detected roadway condition. In response to one or more processors determining that the evasive maneuver was successful, a record of the successful maneuver and the roadway condition are stored in a database. Subsequent to storing the record in the database, one or more computers associated with one or more vehicles is trained to execute the evasive maneuver, in response to determining that the one or more vehicles is exposed to the roadway condition experienced by the vehicle.

12 Claims, 10 Drawing Sheets

(51) Int. Cl.
*B60W 30/085* (2012.01)
*B60W 40/08* (2012.01)

(56) References Cited

U.S. PATENT DOCUMENTS

| | | | |
|---|---|---|---|
| 9,429,947 B1 | 8/2016 | Wengreen et al. | |
| 9,581,997 B1* | 2/2017 | Penilla | G05D 1/0011 |
| 9,701,307 B1* | 7/2017 | Newman | B60W 50/16 |
| 2007/0055428 A1* | 3/2007 | Kong | G06K 9/00369 |
| | | | 701/45 |
| 2008/0119993 A1* | 5/2008 | Breed | B60R 19/205 |
| | | | 701/46 |
| 2013/0033381 A1* | 2/2013 | Breed | B60T 1/005 |
| | | | 340/568.1 |
| 2013/0253809 A1 | 9/2013 | Jones et al. | |
| 2014/0002651 A1 | 2/2014 | Plante | |
| 2014/0046701 A1 | 2/2014 | Steinberg et al. | |
| 2015/0039218 A1* | 2/2015 | Bowers | B60W 30/0956 |
| | | | 701/301 |
| 2015/0336524 A1* | 11/2015 | Larner | B60R 11/04 |
| | | | 293/120 |
| 2016/0163198 A1 | 6/2016 | Dougherty | |
| 2017/0030725 A1 | 2/2017 | Gordon et al. | |
| 2017/0269602 A1* | 9/2017 | Nakamura | B60W 30/09 |
| 2018/0218606 A1* | 8/2018 | Michalakis | G05D 1/0234 |
| 2019/0027038 A1* | 1/2019 | Chintakindi | G08G 1/166 |

OTHER PUBLICATIONS

Robert Kluger, "Network Screening in a Connected Vehicle Environment". trforum.org, Proceedings of the 54th Annual Transportation Research Forum, Mar. 21-23, 2013, Annapolis, Maryland, pp. 1-4.

Aminmansour et al, "Improving Near-Miss Event Detection Rate at Railway Level Crossings". IEEE, Proceedings of the 2015 International Conference on Digital Image Computing: Techniques and Applications (DICTA), Nov. 23-25, 2015, pp. 1-8. (Abstract Only).

J. White et al, "Wreckwatch: Automatic Traffic Accident Detection and Notification With Smartphones", Mobile Networks and Applications, Jun. 2011, 16:285, Springer US. (Abstract Only).

International Searching Authority—International Search Report and Written Opinion for International Application No. PCT/IB2017/057748, dated Apr. 3, 2018, pp. 1-4.

* cited by examiner

TRAINING A SELF-DRIVING VEHICLE

BACKGROUND

The present invention relates generally to the field of vehicles, and specifically to the field of self-driving vehicles. Still more specifically, the present invention relates to the field of managing self-driving vehicles during collision events.

Self-driving vehicles (SDVs) are vehicles that are able to autonomously drive themselves through private and/or public spaces. Using a system of sensors that detect the location and/or surroundings of the SDV, logic within or associated with the SDV controls the speed, propulsion, braking, and steering of the SDV based on the sensor-detected location and surroundings of the SDV.

SUMMARY

In a computer-implemented method embodiment of the present invention, one or more sensors associated with a vehicle detect a roadway condition of a first roadway and an evasive maneuver is performed by the vehicle to avoid the detected roadway condition. In response to one or more processors determining that the evasive maneuver was successful, a record of the successful maneuver and the roadway condition are stored in a database. Subsequent to storing the record in the database, one or more computers associated with one or more vehicles are trained to execute the evasive maneuver, in response to determining that the one or more vehicles is exposed to the roadway condition experienced by the vehicle.

Other embodiments of the present invention include a computer program product and a computer system.

DETAILED DESCRIPTION

Figure 1:
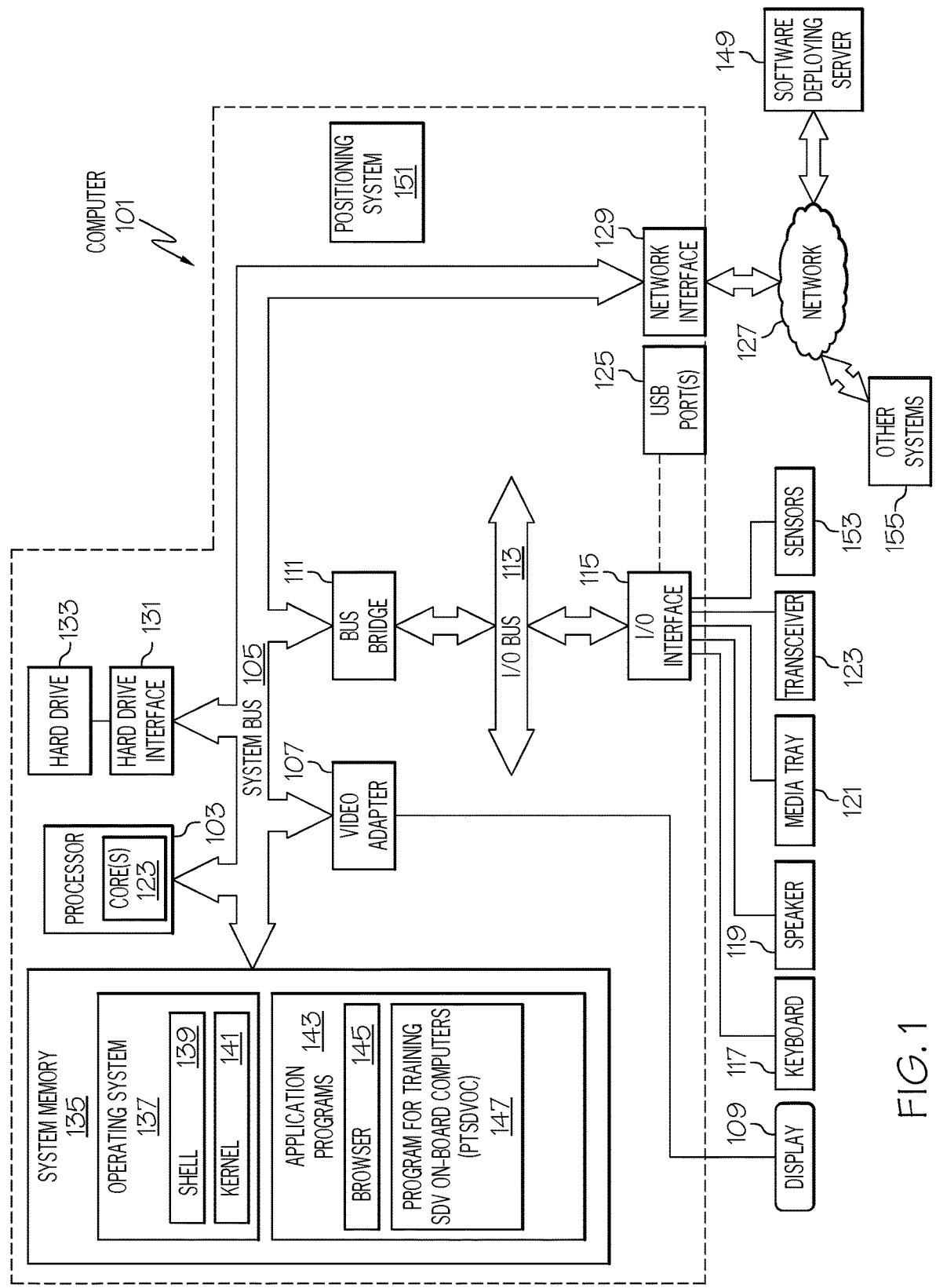
FIG. 1 depicts an exemplary system in accordance with one or more embodiments of the present invention.

With reference now to the figures, and in particular to FIG. 1, there is depicted a block diagram of an exemplary system and network in accordance with one or more embodiments of the present invention. Some or all of the exemplary system and network, including depicted hardware and/or software, shown for and within computer 101 can be utilized by software deploying server 149 or other systems 155 shown in FIG. 1; and/or monitoring system 401 shown in FIG. 4; and/or SDV on-board computer 501 shown in FIG. 5.

Referring now to FIG. 1, exemplary computer 101 includes processor(s) 103, operably coupled to a system bus 105. Although a single processor and core are shown, processor(s) 103 may embody or use multiple processors, one or more of which may have one or more processor core(s) 123. A video adapter 107, which drives/supports a display 109 (which may be a touch screen capable of receiving touch inputs), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a speaker 119, a media tray 121 (which may include storage devices such as CD-ROM drives, multi-media interfaces, etc.), a transceiver 123 that is able to send and transmit wireless electronic messages, sensors 153 that are able to identify traffic and roadway conditions around a vehicle, and external USB port(s) 125. While the format of the ports connected to I/O interface 115 may be any known to those skilled in the art of computer architecture, in one or more embodiments, some or all of these ports are universal serial bus (USB) ports.

As depicted, network interface 129 is also coupled to system bus 105. Network interface 129 can be a hardware network interface, such as a network interface card (NIC), etc. Computer 101 is able to communicate with a software deploying server 149 and/or other systems 155 via network interface 129 and network 127. Network 127 may include (without limitation) one or more external networks—such as a wide area network (WAN), and/or a network of networks such as the Internet—and/or one or more internal networks such as an Ethernet or a virtual private network (VPN). In one or more embodiments, network 127 includes a wireless network, such as a Wi-Fi network, and a cellular network. An example embodiment in a network "cloud" environment will be discussed with reference to FIGS. 9 and 10.

Referring again to FIG. 1, a hard drive interface 131 is also coupled to system bus 105. Hard drive interface 131 interfaces with a hard drive 133. In one embodiment, hard drive 133 is a non-volatile memory storing and populates a system memory 135 (e.g., random access memory (RAM)), which is also coupled to system bus 105. System memory may be considered a lowest level of volatile memory in computer 101. System memory 135 may include additional, higher levels of volatile memory (not shown), including, but not limited to, cache memory, registers and buffers. Data that populates system memory 135 includes computer 101's operating system (OS) 137 and application programs 143.

Operating system (OS) 137 includes a shell 139, for providing transparent user access to resources such as application programs 143. Generally, shell 139 is a program that provides an interpreter and an interface between the user and the OS. More specifically, shell 139 (sometimes referred to as a command processor) can execute commands entered into a command-line user interface or from a file. In other words, shell 139 can serve as a command interpreter. While shell 139 is a text-based, line-oriented user interface, the present invention will equally well support other user interface modes, such as graphical, voice, gestural, etc. As depicted, shell 139 can be considered the highest level of an OS software hierarchy. The shell can also provide a system prompt, interpret commands entered by keyboard, mouse, or other user input media, and send the interpreted command(s) to the appropriate (e.g., lower) levels of the operating system (e.g., a kernel 141) for processing.

As depicted, OS 137 also includes kernel 141, which includes (hierarchically) lower levels of functionality for OS 137. A few (non-limiting) examples of kernel functions include: providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions (not depicted) enabling a world wide web (WWW) client (i.e., computer 101) to send and receive network messages from network 127 (e.g., the Internet using hypertext transfer protocol (HTTP) messaging), thus enabling communication with software deploying server 149 and other systems.

In some embodiments, application programs 143 in computer 101's system memory include Program for Training Self Driving Vehicle On-board Computers (PTSDVOC) 147. In some embodiments, system memory 135 can be shared and/or application programs 143 distributed across one or more software deploying servers 149 or other systems. As depicted, PTSDVOC 147 includes program instructions (software) adapted for implementing processes and/or functions in accordance with the present invention, such as those described with reference to FIGS. 2-8. In some embodiments, PTSDVOC 147 is downloaded from software deploying server 149, (on-demand or "just-in-time", such that the software in PTSDVOC 147 is not downloaded until needed for execution). In one embodiment of the present invention, software deploying server 149 performs all of the functions associated with the present invention (including execution of PTSDVOC 147), thus freeing computer 101 from having to use its own internal computing resources to execute PTSDVOC 147.

The hardware elements depicted in computer 101 are not intended to be exhaustive, but rather are representative to highlight essential components required by the present invention. For instance, computer 101 may include alternate memory storage devices such as flash memory, magnetic cassettes, digital versatile disks (DVDs), Bernoulli cartridges, and the like. These and other variations are intended to be within the spirit and scope of the present invention.

Figure 2:
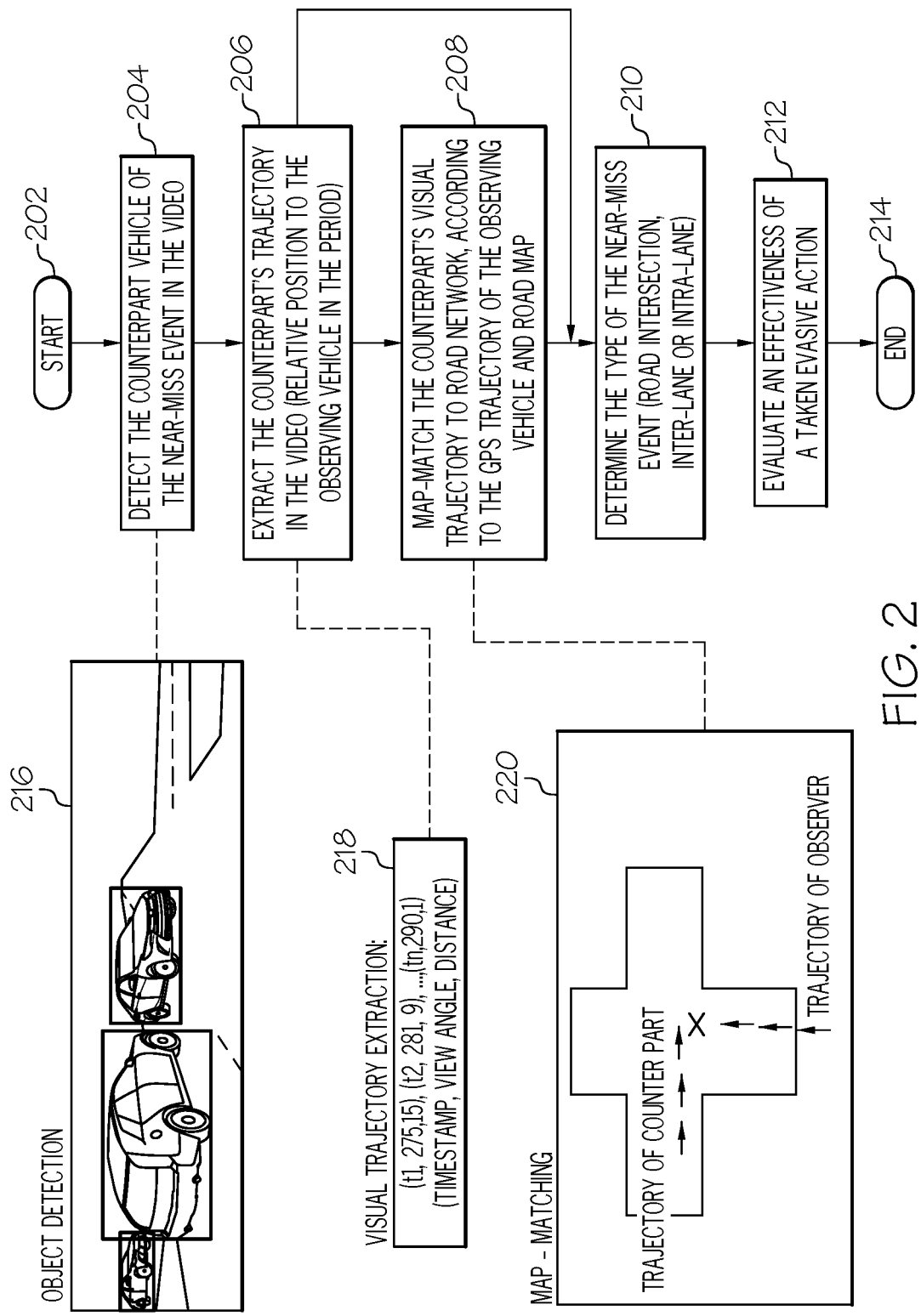
FIG. 2 illustrates a driver of a vehicle performing an evasive action in accordance with one or more embodiments of the present invention.

FIG. 2 illustrates a method for determining and evaluating an effectiveness of an evasive action that is taken by a vehicle. In some embodiments one or more steps of the method are performed by one or more processors and/or other hardware. In some embodiments of the present invention, this (initial) evasive action/maneuver is performed by a human driver of the human-driven vehicle, and in some embodiments of the present invention the evasive action is performed by an on-board computer on a self-driving vehicle. As depicted, after initiator block 202, one or more sensors on a vehicle detect a counterpart vehicle of a near-miss event, as described in block 204. A video camera (either mounted on a fixed device next to a roadway or on the vehicle that takes the evasive action) records the near-miss event. An example of the video record is shown in box 216. A "near-miss" event is defined as an avoidance of two vehicles colliding with one another due to the evasive action performed by one of the vehicles. It is understood that this actually could be called a "near-hit" event (since the two vehicles "nearly hit" each other), but the term "near-miss" is commonly used to describe two objects barely missing one another, and such common term will be used herein.

In block 206, one or more processors extract the counterpart vehicle's trajectory based on the video shown in box 216 and/or sensor information. For example, as depicted in the box 218, such extracted information can include timestamps, viewing angles, the inter-vehicular distance (e.g., from the camera taking the video), the vehicles shown in the video and/or other sensor data (not depicted). In some embodiments, one or more processors (e.g., on a monitoring computer such as monitoring system 401 described below in FIG. 4) can detect whether or not the vehicles hit each other, and if not, by how large a margin (spacing) the near-miss was.

In block 208, one or more processors "map-match" the counterpart vehicle's visual trajectory to a road network, e.g., using a global positioning system (GPS) associated with the camera that took the video or with one or more of the vehicles in the video. This allows the system to map the recorded near-miss event to a particular map/location, as shown in the example depicted in box 220. In some embodiments, such mapping can facilitate future recommendations, e.g., that other vehicles (such as SDVs) perform the same type of evasive action. In block 210, one or more processors may determine (e.g., characterize) the type of near-miss event (e.g., whether or not it occurred at a roadway intersection, or by one or more vehicles switching lanes, etc.).

In block 212, one or more processors evaluate an effectiveness of the evasive action taken by one of the involved vehicles shown in the video. That is, an evasive maneuver may have avoided an impact with another vehicle, but the violent movement of the evasive maneuver may cause a pedestrian to be struck and injured, and may have damaged the vehicle making the evasive maneuver (e.g., by striking a fixed object, putting too much strain on a mechanical system or vehicle's tires, etc.).

The process ends at terminator block 214.

Figure 3:
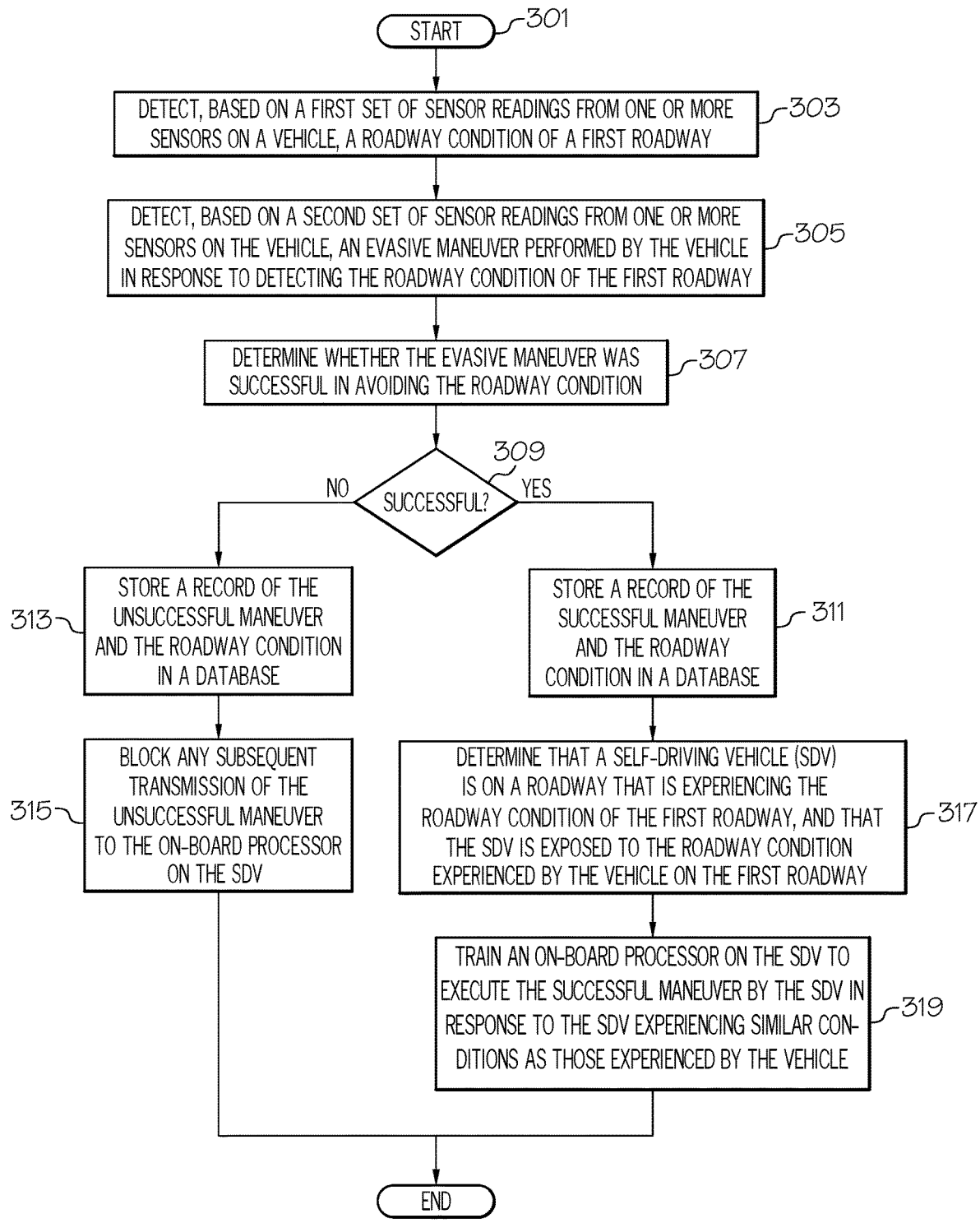
FIG. 3 illustrates an exemplary process in accordance with one or more embodiments of the present invention.

FIG. 3 depicts another exemplary embodiment of a method in accordance with the present invention.

Figure 4:
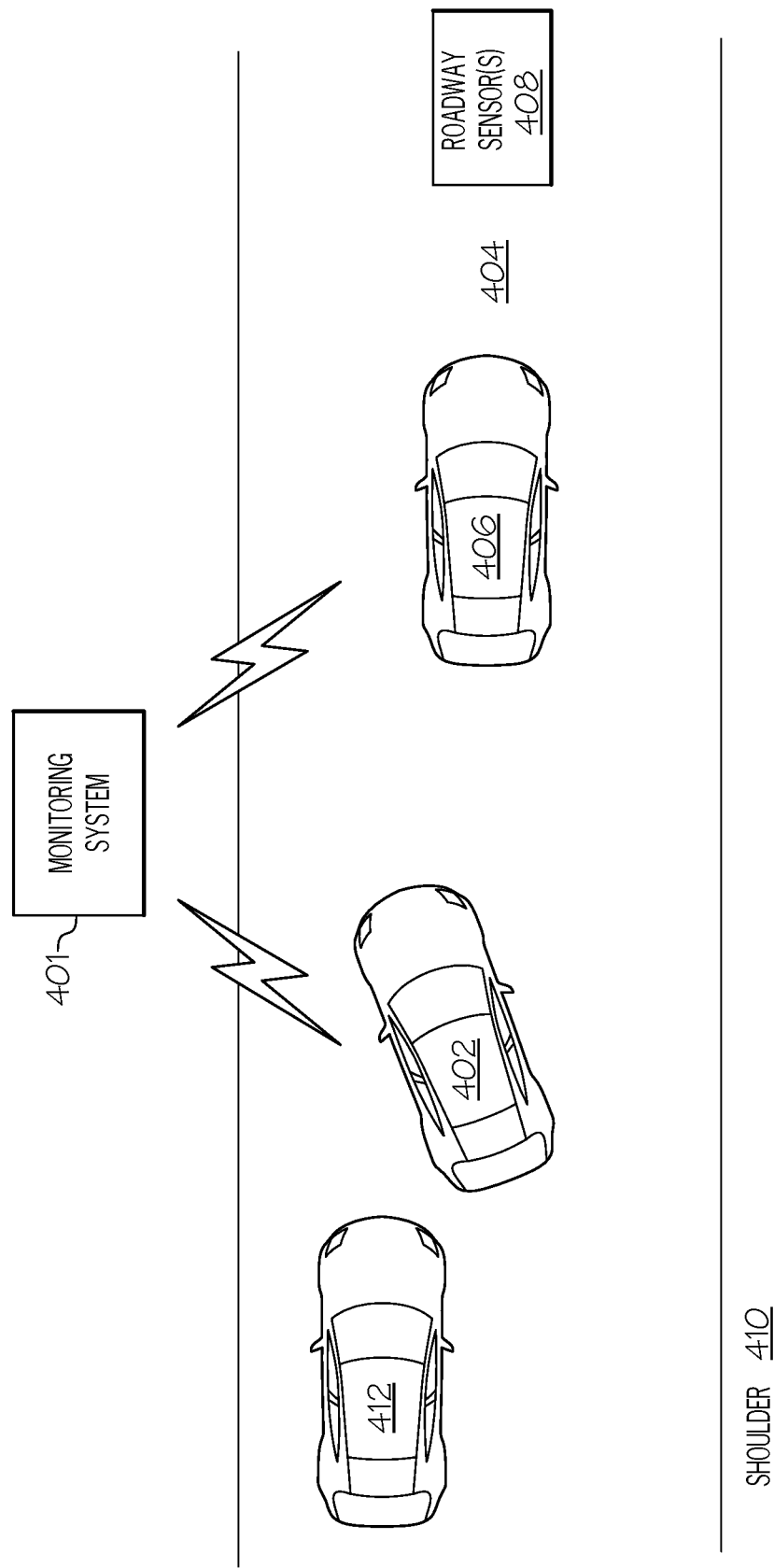
FIG. 4 illustrates an exemplary vehicle performing a maneuver, in accordance with one or more embodiments of the present invention.

As depicted, after initiator block 301, one or more sensors (e.g., a camera, a microphone, a motion detector, etc. mounted on a vehicle and/or on a fixed support adjacent to a roadway, or part of roadway sensor(s) 408 shown in FIG. 4) detect a roadway condition of a first roadway, in block 303. For example, as shown in FIG. 4, cameras on a vehicle 402 (which in one or more embodiments of the present invention is a human driven vehicle while in one or more other embodiments of the present invention is a self-driving vehicle) detect lighting, darkness, rain, snow, sleet, ice, etc. on a roadway 404 on which the vehicle 402 is traveling.

In block 305, one or more sensors (e.g., a camera, an accelerometer, a microphone, etc.) on the vehicle detect an evasive maneuver performed by the vehicle (e.g., vehicle 402 shown in FIG. 4) in response to detecting the roadway condition, which may be a traffic hazard (e.g., vehicle 406 shown in FIG. 4) on the first roadway. With reference now to the example depicted in FIG. 4, this traffic hazard may be: another vehicle that the vehicle is about to hit if no evasive actions are taken; a pedestrian that the vehicle is about to hit if no evasive actions are taken; a fixed object (e.g., a pothole, an obstruction such as an object that has fallen off another vehicle, etc.) that the vehicle is about to hit if no evasive actions are taken; etc. However, this example assumes that the vehicle does take an evasive action to avoid the traffic hazard.

In block 307, a determination is made by one or more processors as to whether the evasive maneuver was successful in avoiding the roadway condition (i.e., the vehicle missed a traffic hazard without causing greater harm to another person, object, the vehicle itself, etc.).

In query block 309 and block 311, if the evasive maneuver was successful, then a record/description of the successful maneuver and the roadway condition (at the time of the evasive maneuver) is stored in a database (e.g., within or associated with monitoring system 401 shown in FIG. 4).

However, if the evasive maneuver was not successful (e.g., it resulted in the traffic hazard being struck by the vehicle, and/or the vehicle caused harm to a pedestrian, another vehicle, etc.), in block 313, a record/description of the unsuccessful maneuver, along with the applicable roadway condition (at the time of the evasive maneuver) are stored in a database (e.g., within or associated with monitoring system 401 shown in FIG. 4).

In some embodiments, if the evasive maneuver was unsuccessful, then a self-driving vehicle (SDV) (e.g., undergoing training) can either not be told about the evasive maneuver, or given a description of the unsuccessful evasive maneuver along with explicit directions to not use it if the SDV is confronted with a similar traffic hazard under similar roadway conditions.

After block 313, in block 315, the description of this unsuccessful maneuver is blocked from ever being transmitted to an on-board processor on a self-driving vehicle (SDV), which is being trained. In some embodiments, the description of this unsuccessful maneuver is transmitted to the on-board processor on the SDV, but with explicit directions to the SDV to not use the unsuccessful maneuver.

Subsequent to storing the record of the successful maneuver and the roadway condition in the database (in block 311), the process proceeds to block 317. In block 317, one or more processors (e.g., within the SDV on-board computer 601 described below in FIG. 6) determine that a self-driving vehicle (SDV) is on a roadway that is experiencing the roadway condition of the first roadway, and that the SDV is exposed to the roadway condition (i.e., a traffic hazard) experienced by the vehicle on the first roadway. In another embodiment, one or more computers associated with one or more vehicles may be determined to be exposed to the roadway condition experienced by the vehicle.

In block 319, if the SDV (or the one or more vehicles) is on the roadway that is experiencing the roadway condition of the first roadway (i.e., is exposed to the traffic hazard experienced by the vehicle on the first roadway), then an on-board processor (e.g., part of the on-board computer 601 shown in FIG. 6) on the SDV (e.g., SDV 412 shown in FIG. 4) is trained to perform/execute the successful maneuver that was performed by the vehicle to avoid the roadway condition.

The method ends at (terminator) block 321.

Figure 5:
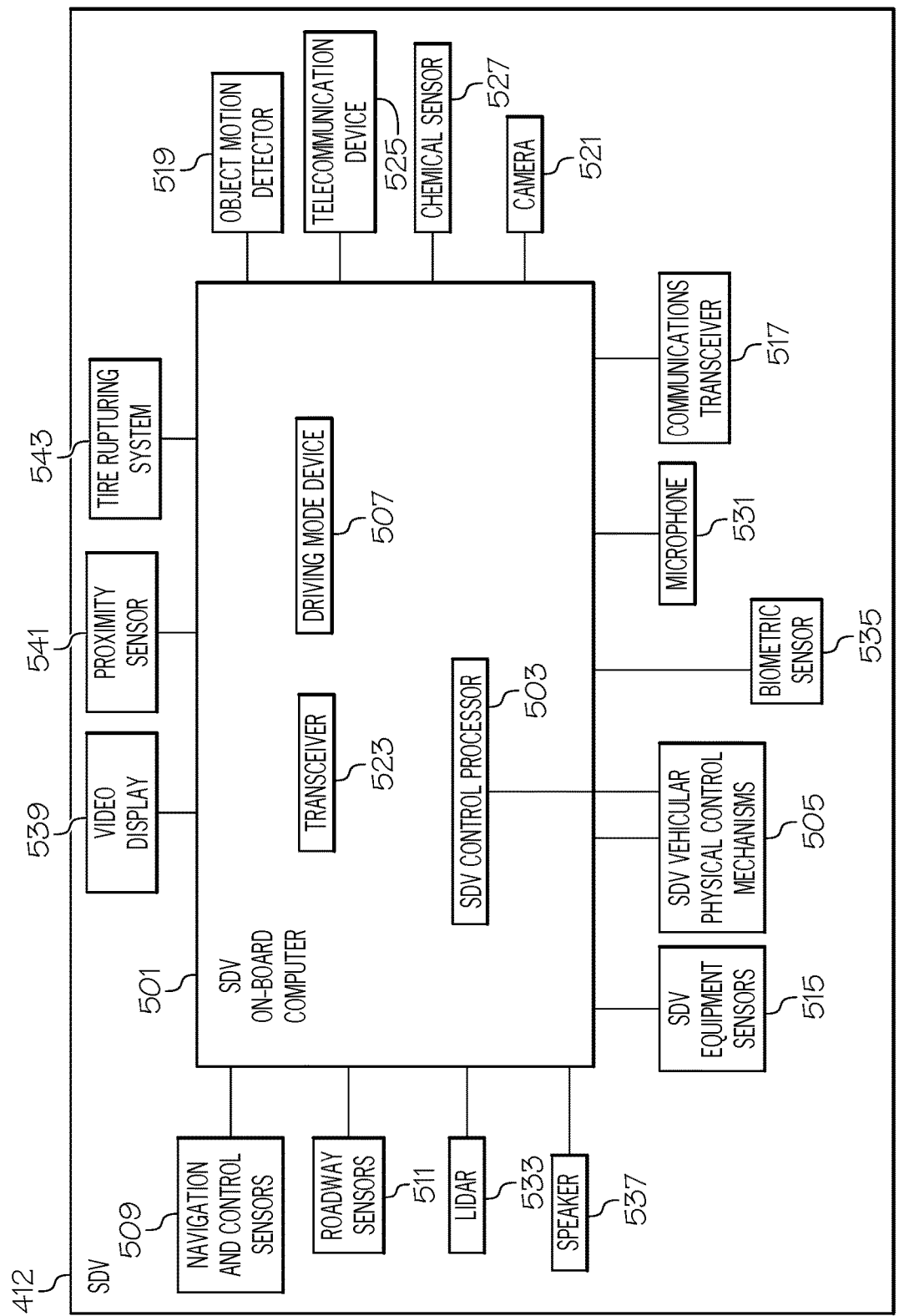
FIG. 5 depicts additional detail of one or more vehicles illustrated in FIG. 4.

With reference now to FIG. 4 and FIG. 5, an exemplary embodiment of a system in accordance with the present invention are depicted. For purposes of clarity and this example only, the system described and referred to in FIG. 5 as SDV 412, is assumed to be embodied in or associated with vehicle 412 (of FIG. 4). It is also understood that one or more elements shown in FIG. 5 may also be used by other vehicles e.g., vehicle 402 when configured as an SDV.

Referring now to FIG. 5, SDV 412 has an on-board computer 501 that can autonomously control one or more operations of SDV 412. According to directives from a driving mode device 507, the SDV 412 can be selectively operated in manual mode or autonomous mode. In some embodiments, driving mode device 507 is a dedicated hardware device that can selectively direct the SDV on-board computer 501 to operate the SDV 412 in an autonomous mode or in a manual mode.

While in autonomous mode, SDV 412 can generally operate without the input of a human driver, such that the engine, steering mechanism, braking system, horn, signals, etc. are controlled by the SDV control processor 503, which is now under the control of the SDV on-board computer 501. That is, by the SDV on-board computer 501 processing inputs taken from navigation and control sensors 509 and the driving mode device 507 (indicating that the SDV 412 is to be controlled autonomously). In other words, in autonomous mode, manual driver input to the SDV control processor 503 and/or SDV vehicular physical control mechanisms 505 are not needed.

As mentioned, the SDV on-board computer 501 uses outputs from navigation and control sensors 509 to control the SDV 412. Navigation and control sensors 509 include hardware sensors that 1) determine the location of the SDV 412; 2) sense other cars and/or obstacles and/or physical structures around SDV 412; 3) measure the speed and direction of the SDV 412; and 4) provide any other inputs needed to safely control the movement of the SDV 412.

With respect to the feature of 1) determining the location of the SDV 412, this can be achieved through the use of a positioning system such as positioning system 151 shown in FIG. 1. Positioning system 151 may use a global positioning system (GPS), which uses space-based satellites that provide positioning signals that are triangulated by a GPS receiver to determine a 3-D geophysical position of the SDV 412. Positioning system 151 may also use, either alone or in conjunction with a GPS system, physical movement sensors such as accelerometers (which measure acceleration of a vehicle in any direction), speedometers (which measure the instantaneous speed of a vehicle), airflow meters (which measure the flow of air around a vehicle), etc. Such physical movement sensors may incorporate the use of semiconductor strain gauges, electromechanical gauges that take readings from drivetrain rotations, barometric sensors, etc.

With respect to the feature of 2) sensing other cars and/or obstacles and/or physical structures around SDV 412, the positioning system 151 may use radar or other electromagnetic energy that is emitted from an electromagnetic radiation transmitter (e.g., transceiver 523 shown in FIG. 5), bounced off a physical structure (e.g., another car), and then received by an electromagnetic radiation receiver (e.g., transceiver 323). An exemplary positioning system within SDV 412 is a Light Detection and Ranging (LIDAR) (e.g., LIDAR 533 shown in FIG. 5) or Laser Detection and Ranging (LADAR) system that measures the time it takes to receive back the emitted electromagnetic radiation (e.g., light), and/or evaluate a Doppler shift (i.e., a change in frequency to the electromagnetic radiation that is caused by the relative movement of the SDV 412 to objects being interrogated by the electromagnetic radiation) in the received electromagnetic radiation from when it was transmitted, the presence and location of other physical objects can be ascertained by the SDV on-board computer 501.

With respect to the feature of 3) measuring the speed and direction of the SDV 412, this can be accomplished by taking readings from an on-board speedometer (not depicted) on the SDV 412 and/or detecting movements to the steering mechanism (also not depicted) on the SDV 412 and/or the positioning system 151 discussed above.

With respect to the feature of 4) providing any other inputs needed to safely control the movement of the SDV 412, such inputs include, but are not limited to, control signals to activate a horn, turning indicators, flashing emergency lights, etc. on the SDV 412.

In one or more embodiments of the present invention, SDV 412 includes roadway sensors 511 that are coupled to the SDV 412. Roadway sensors 511 may include sensors that are able to detect the amount of water, snow, ice, etc. on the roadway 404 (e.g., using cameras, heat sensors, moisture sensors, thermometers, etc.). Roadway sensors 511 also include sensors that are able to detect "rough" roadways (e.g., roadways having potholes, poorly maintained pavement, no paving, etc.) using cameras, vibration sensors, etc. Roadway sensors 511 may also include sensors that are able to detect how dark the roadway 404 is using light sensors.

Similarly, a dedicated camera 521 can be trained on roadway 404, in order to provide photographic images of conditions on the roadway 404 upon which the SDV 412 is traveling.

Similarly, a dedicated object motion detector 519 (e.g., a radar transceiver capable of detecting Doppler shifts indicative of the speed and direction of movement of other vehicles, animals, persons, etc. on the roadway 404) can be trained on the roadway 404 upon which the SDV 412 is traveling.

In one or more embodiments of the present invention, also within the SDV 412 are SDV equipment sensors 515. SDV equipment sensors 515 may include cameras aimed at tires on the SDV 412 to detect how much tread is left on the tire. SDV equipment sensors 515 may include electronic sensors that detect how much padding is left of brake calipers on disk brakes. SDV equipment sensors 515 may include drivetrain sensors that detect operating conditions within an engine (e.g., power, speed, revolutions per minute—RPMs of the engine, timing, cylinder compression, coolant levels, engine temperature, oil pressure, etc.), the transmission (e.g., transmission fluid level, conditions of the clutch, gears, etc.), etc. SDV equipment sensors 515 may include sensors that detect the condition of other components of the SDV 412, including lights (e.g., using circuitry that detects if a bulb is broken), wipers (e.g., using circuitry that detects a faulty wiper blade, wiper motor, etc.), etc. Thus, in one or more embodiments of the present invention, if the vehicle (e.g., vehicle 402 shown in FIG. 4) performs an ameliorative/evasive maneuver (e.g., pulls off to the shoulder 410 of roadway 404, collides with an object with the crumple zone 702a of the SDV 412 shown in FIG. 7, etc.), then the first SDV 412 will perform this same evasive maneuver only if 1) the traffic/roadway conditions are similar, and 2) this evasive maneuver was successful.

In one or more embodiments of the present invention, also within SDV 412 is a communications transceiver 517, which is able to receive and transmit electronic communication signals (e.g., RF messages) from and to other communications transceivers found in other vehicles, servers, monitoring systems, etc.

In one or more embodiments of the present invention, also within SDV 412 is a telecommunication device 525 (e.g., a smart phone, a cell phone, a laptop computer, etc.), which may be connected (e.g., via a near field communication— NFC connection) to the SDV on-board computer 501.

In one or more embodiments of the present invention, also within SDV 412 is a speaker 537, which is able to broadcast aural warnings (e.g., a buzzer, alarm, or computer-generated voice) that apprise the occupants of the SDV 412 and/or other persons/vehicles of an upcoming ameliorative/evasive maneuver that SDV 412 will be performing.

In one or more embodiments of the present invention, also within SDV 412 is a video display 539, which is able to display visual warnings (e.g., a flashing light, a text message, etc.) that apprise the occupants of the SDV 412 and/or other persons/vehicles of an upcoming ameliorative/evasive maneuver that SDV 412 will be performing.

In one or more embodiments of the present invention, also within SDV 412 is a proximity sensor 541, which uses motion detectors, radar (using Doppler shifting logic), etc. that detect an object (e.g., a vehicle in a next lane) near SDV 412.

In one or more embodiments of the present invention, also within SDV 412 is a tire rupturing system 543, which is capable of causing one or more tires on SDV 412 to deflate. For example, tire rupturing system 543 may be an explosive device (e.g., compressed air canister) that, when activated by SDV on-board computer 501, will cause a tire to blow out, resulting in SDV 412 coming to an abrupt slow-down in order to avoid a collision.

Despite a high level of ability of SDVs to detect and respond to traffic scenarios, (due to quick response times of computers that control SDVs), sometimes SDV collisions may be unavoidable.

In accordance with one or more embodiments of the present invention, if an SDV has no occupant, then the SDV may take certain actions that may lead to its own irreparable damage, in order to so as to avoid harm to an object about to be struck (e.g. another car with passengers, a pedestrian, etc.). That is, if the SDV "knows" that it has no human passengers, and the SDV is about to hit another vehicle that may or may not contain human passengers, then the SDV will sacrifice its own well-being (e.g., by swerving off a cliff) rather than hitting the other vehicle.

Thus, and as described herein, the present invention utilizes a self-driving vehicle (SDV), a means for determining that a crash (collision) is imminent with confidence C1, a means for determining if the SDV has a passenger (occupant) of type P with confidence C2, and a means for determining aspects of the object to be collided with, with confidence C3. Based on C1, C2, C3, and P, the system plans a real-time amelioration action, which may avoid a collision or may simply mitigate the harm caused by an unavoidable collision. For example, if the SDV has no occupant, it may take certain actions that may cause more damage to itself in a collision (such as breaking apart more easily) than it would if it had an occupant.

The determining of a crash with confidence C1 may be based on analytics of sensor data (e.g., a captured visual image of an object in a travel path, LIDAR information about a distance between the SDV 412 and another vehicle/object, etc.). That is, the determination that SDV 412 is about to be involved in a collision with another object is at a confidence level C1. For example, C1 may be "there is a 90% probability that SDV 412 is about to hit an object if no ameliorative steps are taken to avoid that object".

Passenger type P may be any of human, pet, package (e.g. for delivery), or no passenger at all. Confidence C2 is the confidence level (e.g., probability) that the system has accurately identified what type of occupant (animate or inanimate) is currently within SDV 412.

Confidence C3 is the confidence level (e.g., probability) that the system has accurately identified what type of object is about to be hit by SDV 412 (i.e., is the object a manually controlled vehicle, an SDV, a pedestrian, an animal, etc.), and/or what types and quantity of occupants are within the other vehicle (assuming that the object that the SDV 412 is about to hit is another vehicle).

As described herein, the object that SDV 412 is about to collide with may be any of: another SDV (with or without passenger), another vehicle that is not an SDV, a person, an animal, a tree, a rock, a guard rail, a deer, school bus, bridge, etc.

In addition, the object may be behind SDV 412. For example, when an SDV senses it is about to become disabled on a road with fast moving traffic close behind, and when a shoulder is narrow or unavailable, the SDV without passengers may determine that driving over an embankment poses less risk to human drivers behind it than becoming disabled in the roadway.

In various embodiments of the present invention, the amelioration action may be one or more of: allowing the SDV 412 to break apart (so as to lessen the impact on the object to be collided with); performing a certain kind of very aggressive braking or steering maneuver; allowing the SDV 412 to self-destruct (e.g., with a tree on the side of the road); blowing out the SDV tires (in order to quickly bring the SDV 412 to a stop); not triggering the air bags within the SDV 412 (if no occupant is in the car); allowing the SDV 412 to "crumple" into the occupant area if there is no occupant; etc.

In one or more embodiments of the present invention, SDV 412 has an array of sensors, which are employed to detect an imminent collision. For example, consider the exemplary SDV 412 depicted in FIG. 6.

Figure 6:
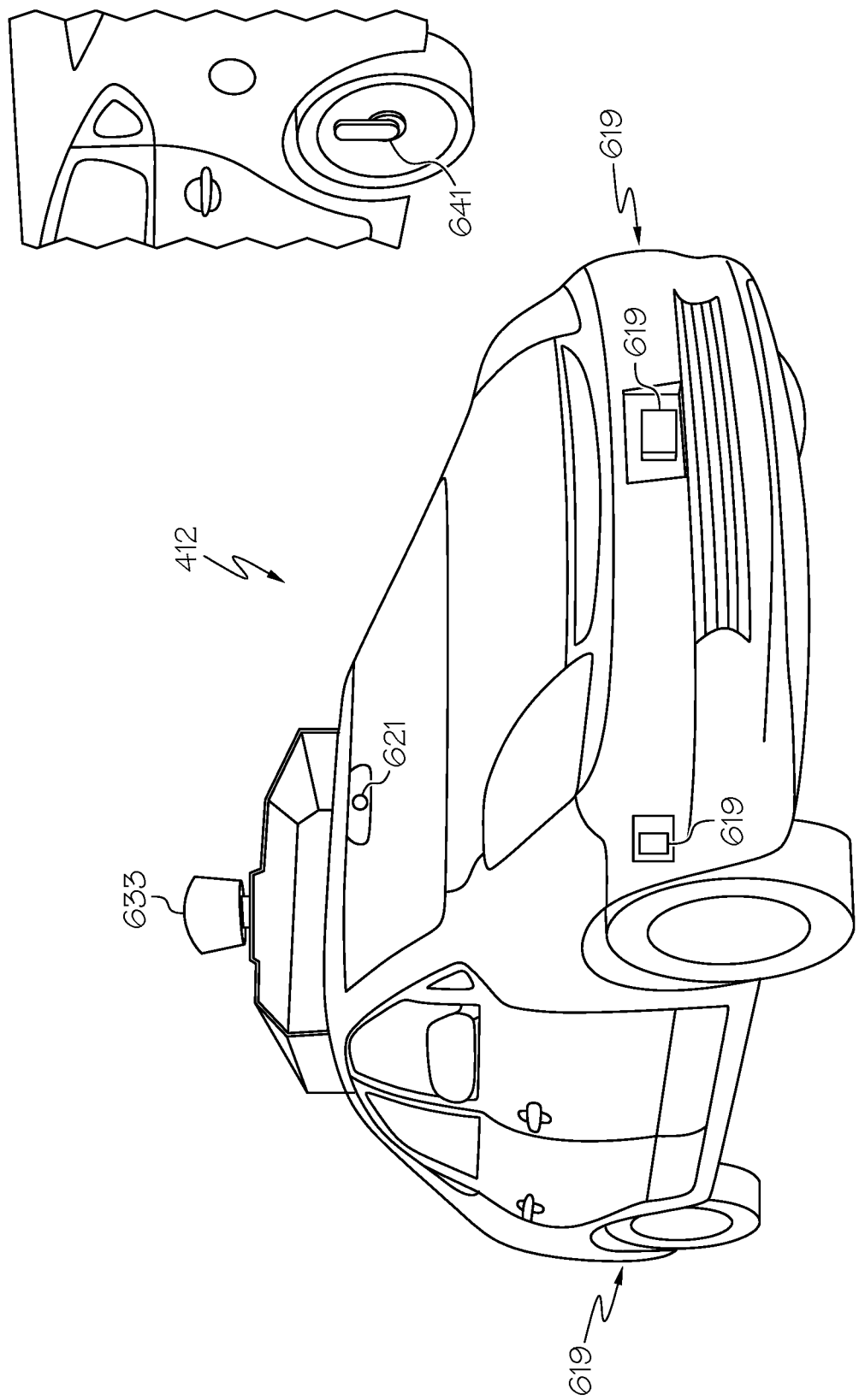
FIG. 6 illustrates an exemplary placement of sensors on an SDV, in accordance with one or more embodiments of the present invention.

As depicted in FIG. 6, SDV 412 includes LIDAR 633 (analogous to LIDAR 533 depicted in FIG. 5), which uses a rotating roof-top mounted device, which can act a laser range finder. The LIDAR includes an array of multiple (e.g., 64 or more) laser beams, from which the device can create 3-D images of objects, (and thus can be considered a camera) which can help the car "see" (e.g., recognize and register) objects (and hazards) along its route. For example, a LIDAR device can calculate how far an object is from the moving vehicle based on the time it takes for its laser to hit the object and return. Some (high intensity) lasers can calculate distance and create images for objects within a 200-meter range.

Distance sensors 619 (analogous to object motion detector 519 shown in FIG. 5) are mounted on the front and rear bumpers of SDV 412 to enable SDV 412 to be aware of the distance to vehicles in front of it and behind it. In some embodiments, distance sensors 619 may be implemented by radar transceivers. As known to those skilled in the art of electronics, radar is an object-detection system that uses radio waves to determine the distance, angle, and/or velocity of objects.

As depicted in FIG. 6, a video camera 621 (analogous to camera 521 shown in FIG. 5) may be mounted on the windshield of SDV 412. This camera, with the help of image processing and artificial intelligence found within on-board SDV computer 501, will interpret common road behavior and motorist signs. For example, if a cyclist gestures that he intends to make a turn, the driverless car interprets it correctly and slows down to allow the cyclist to turn. Predetermined shape and motion descriptors are programmed into the system to help the SDV 412 make intelligent decisions.

Position estimator 641 (analogous to proximity sensor 541 shown in FIG. 5) may be configured as an ultrasonic sensor, which uses sound propagation to detect objects. Position estimator 641 can also be used as a geophysical location device, when mounted on one of the rear wheels of SDV 412, thus enabling position estimator 641 to calculate the number of rotations of the wheel in order to find the exact location of the SDV 412.

Figure 7:
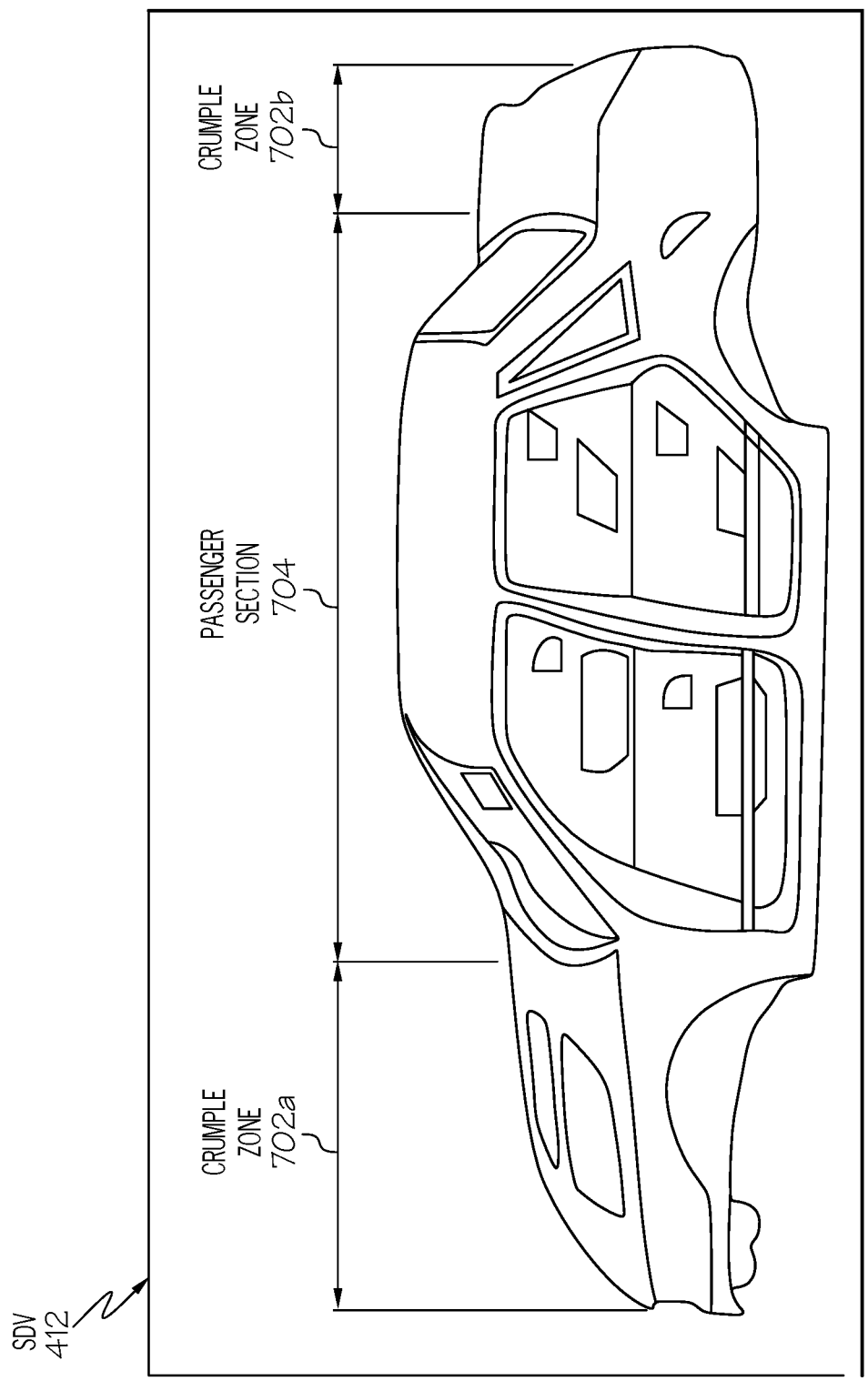
FIG. 7 depicts various crumple zones on an SDV as utilized in accordance with one or more embodiments of the present invention.

With reference now to FIG. 7, SDV 412 includes crumple zones 702a-702b, which can absorb and/or dissipate the energy from the impact during a traffic collision e.g., by controlled deformation. In some embodiments, SDV 412 is designed such that crumple zones 702a-702b will absorb and/or dissipate the energy of a collision, thereby protecting the passengers riding in the passenger section 704. Exemplary crumple zones 702a-702b may use aluminum, composite/carbon fiber honeycomb, energy absorbing foam or any material that sufficiently absorbs, attenuates and/or dissipates crash energy. Thus, in some embodiments, the SDV on-board computer 501 within SDV 412 "knows" the energy absorbing capabilities of crumple zone 702a-702b, and also knows (e.g., based on sensors embedded in the seating) that there are passengers riding within passenger section 704, then the SDV on-board computer 501 within SDV 412 will maneuver SDV 412 just before a collision such that the most collision energy can be absorbed by crumple zone 702a and/or crumple zone 702b, thereby protecting the passengers within passenger section 704. In some embodiments, if the SDV 412 determines there are no passengers, then SDV 412: may not take passenger "whiplash" or "crumple zones" into account when taking actions; and may ignore otherwise excessive "G" forces that can occur with very aggressive braking, swerving, etc.

A characterization (of the object to be collided with) may include an assessment of object's weight (since the results of collision may depend on the relative weights of the SDV 412 and the object being struck).

The present invention is able to handle many collision scenarios. For example, suppose that SDV 412 "knows" it will crash (e.g., based on sensor readings from sensors on SDV 412) head-on into another vehicle or a fixed object (e.g., a large appliance that just fell off the back of a truck in front of the SDV 412). If SDV 412 has a human passenger, it might swerve such that it hits another vehicle moving in the same direction, relying on the known crumple zones of both vehicles to protect their passengers (including the passengers within SDV 412). However, if SDV 412 has no passenger, then it might choose to effectively sacrifice itself e.g., by breaking apart, slamming into a concrete wall, driving over a cliff, etc., thereby protecting passengers in other vehicles from potential harm. By way of another example, multi-vehicle pile-ups on highways can present a very serious danger to drivers, sometimes involving more than 100 cars. When an SDV such as SDV 412 is involved in a pile-up and has no passengers, the present invention enables SDV 202 to change vehicle parameters in order to absorb more of the pile-up as the pile-up grows in size, even to the point of SDV 412 allowing itself to be pulverized (in order to provide an additional barrier/cushion to other vehicles).

In accordance with one or more embodiments of the present invention, an electronic system (e.g., SDV on-board computer 501) in SDV 412 includes crash prediction modules and sensor systems each arranged to sense or predict an imminent crash involving SDV 412. An occupant-sensing system may detect the presence of an occupant. The crash prediction system(s) and the occupant-sensing system(s) may be connected to a bus and supplied with power by the bus and communication through the bus. Each occupant device and crash-prediction device may be actuated in the event of a predicted crash involving the vehicle as sensed by a sensor system. The system for predicting and evading crashes of the SDV may include an imaging system of the surroundings.

In one or more embodiments of the present invention, crash prediction is achieved through the user of a neural network (e.g., part of SDV on-board computer 501) which has been previously trained with training data to predict the possibility of crashing, where the training data represents ever-changing views previously picked-up by an image picking-up means during the driving of vehicles.

The SDV 412 may include a vehicle travel management system that monitors the location of vehicles in a travel lane, as well as other objects in the vicinity of the SDV 412. This information is then used by the SDV on-board computer to generate an amelioration action upon determining that SDV 412 is about to be involved in a collision.

Figure 8:
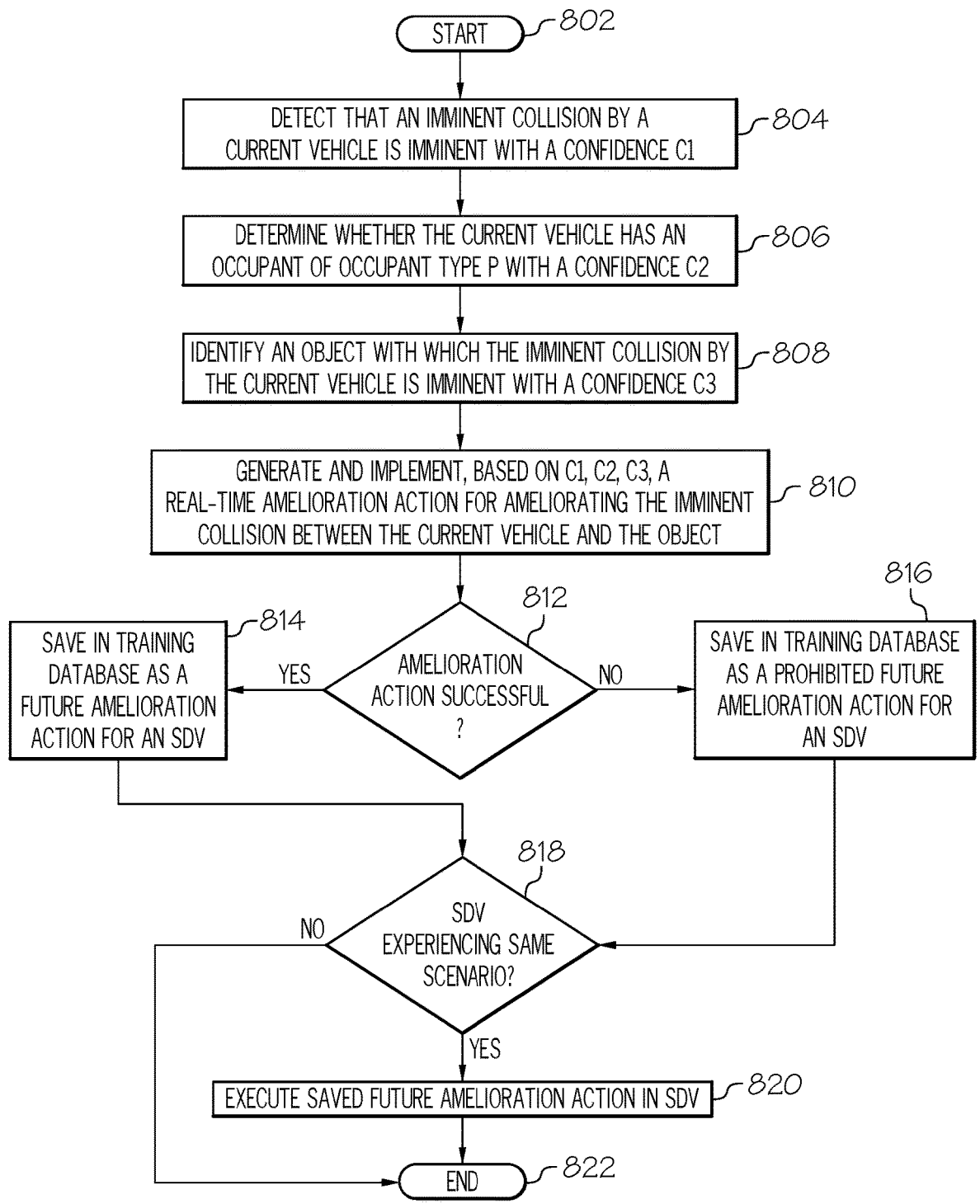
FIG. 8 illustrates another exemplary process in accordance with one or more embodiments of the present invention.

FIG. 8, depicts another exemplary process in accordance with one or more embodiments of the present invention.

As depicted, after initiator block 802, one or more processors (e.g., within SDV on-board computer 501 shown in FIG. 5) detect that an imminent collision by a self-driving vehicle (SDV) is imminent with a confidence C1, in block 804. For example, SDV on-board computer 501 within SDV 412 may determine that SDV 412 is about to collide with another vehicle, fixed object, pedestrian, etc., unless ameliorative steps are taken to alter the path of SDV 412. This determination has a confidence level C1, which is the probability (e.g., 95%) that the SDV on-board computer 501 has accurately made the prediction. This confidence level C1 may be based on past experiences with other SDV on-board computers 501 programmed in a similar manner (and/or under similar roadway conditions, traffic conditions, SDV configuration, etc.). That is, if other SDV on-board computers 501 have correctly predicted that the SDVs in which they are located are going to have an immediate collision 95% of the time, then confidence level C1 would be 95.

In block 806, one or more processors determine whether the SDV has an occupant of occupant type P with a confidence C2. This confidence level C2 may be based on past experiences with other SDV on-board computers 501 programmed in a similar manner and/or utilizing similar sensors within the cabin of SDV 412 (e.g., camera 521 aimed at the interior of the cabin of SDV 412). That is, if other SDV on-board computers 301 have correctly identified the occupant type P (i.e., where P=human) 99% of the time, then confidence level C2 would be 99.

In block 808, one or more processors identify an object with which the imminent collision by the SDV is imminent with a confidence C3. For example, the processors may identify vehicle 406 in front of SDV 402 shown in FIG. 4 with a 90% confidence level. This confidence level C3 may be based on past experiences with the SDV on-board computer 501 within SDV/vehicle 402 and/or other SDV on-board computers 501 on other SDVs that have been programmed in a similar manner (and/or under similar roadway conditions, traffic conditions, SDV configuration, etc.). That is, if these SDV on-board computers 501 have correctly identified objects that are about to be hit by the SDV in which they are located are going to have an immediate collision 90% of the time, then confidence level C3 may be 90.

Thus, confidence level C1 reflects how confident the system is that it has correctly predicted/detected an imminent collision. Confidence level C2 reflects how confident the system is that it has corrected determined what type of occupants (if any) are currently in the SDV. Confidence level C3 reflects how confident the system is that it has correctly identified the object about to be hit by the SDV. Confidence level C3 is based on 1) how confident the system is that it has detected the object about to be hit by the SDV, and/or 2) how confident the system is that it has identified what type of object (person, vehicle, animal, etc.) is about to be hit.

In block 810, one or more processors then generate and implement, based on C1, C2, C3, and P, a real-time amelioration action for ameliorating the imminent collision between the SDV and the object. That is, once values for C1, C2, C3 and P are entered into the SDV on-board computer 501, then SDV on-board computer 501 is able to tell the SDV 412 what ameliorative steps (braking, speeding up, swerving, crashing into another object, etc.) the SDV/vehicle 402 is to take.

In block 812, a query is made as to whether or not the ameliorative/evasive action taken by vehicle 402 was successful (e.g., vehicle 402 avoided hitting something). If not, in block 816, the unsuccessful ameliorative/evasive action is saved in a training database as a prohibited future amelioration action that should never be taken by another SDV (block 816). However, if the evasive action was successful, in block 814, a description and directions for how to perform this evasive action are sent to the SDV on-board computer 501 on SDV 412. In block 818, if it is determined that SDV 412 may experiences a similar traffic situation/hazard under similar environmental/weather/lighting conditions, in block 820 SDV 412 will perform the evasive maneuver that proved successful when performed by the SDV/vehicle 402 in the past under similar circumstances.

The process ends at (terminator) block 822.

In a further embodiment of the present invention, one or more processors determine a confidence (C1) level based on an analysis of sensor data received (e.g., in real-time) from one or more sensors on the SDV. That is, SDV on-board computer 501 is able to determine how confident it is that it has correctly identified the object and/or object type about to be hit by SDV 412 based on camera readings (e.g., from vehicle camera 621), LIDAR 633, microphone 531 (detecting the sound of the object about to be hit), etc.

In an embodiment of the present invention, the occupant type P describes animate passengers in the SDV. That is, the system (e.g., using biometric sensor 535 and/or camera 521 and/or microphone 531 trained on passengers in SDV 412) will provide sensor readings that are associated with animate passengers. For example, such sensors may detect human sounds in the cabin on SDV 412 indicative of the presence of a human passenger inside the SDV 412. SDV on-board computer 501 will then adjust the real-time ameliorative action accordingly.

In an embodiment of the present invention, the occupant type describes inanimate passengers in the SDV. For example, if biometric sensor 535 and/or camera 521 and/or microphone 531 trained on an interior cabin of SDV 412 detect no life forms, then SDV on-board computer 501 will assume that SDV 412 is only hauling cargo, and will adjust the real-time ameliorative action accordingly. That is, if no human lives are in danger, the real-time ameliorative action will be more likely to result in dramatic braking, deliberately hitting a wall, etc., unless doing so would damage the cargo.

In an embodiment of the present invention, the occupant type describes a lack of any occupants in the SDV. For example, if camera 521 trained on an interior cabin of SDV 412 detects no life forms, no cargo, etc., then SDV on-board computer 501 will assume that SDV 412 is empty, and will adjust the real-time ameliorative action accordingly. That is, if there is no risk to either human passengers or cargo, the real-time ameliorative action will be more likely to result in drastic steps up to and including severely damaging the SDV 412 in order to avoid risking damage/injury to other entities.

In an embodiment of the present invention, the object to be imminently collided with by the SDV is another SDV that has a human passenger. As such, the SDV on-board computer 501 in SDV/vehicle 402 will generate a real-time ameliorative action that poses the least risk to both passengers in SDVs 402/412 (if any) as well as passengers in the other vehicle (e.g., vehicle 406 shown in FIG. 4) that is about to be hit.

In an embodiment of the present invention, the object to be imminently collided with by the SDV is another SDV that has no passenger. As such, the SDV on-board computer 501 in SDV/vehicle 402 will generate a real-time ameliorative action that poses the least risk to passengers in SDVs 402/412, while not being concerned about property damage to the unoccupied vehicle (e.g., vehicle 406 shown in FIG. 4) that is about to be hit.

In an embodiment of the present invention, the object to be imminently collided with by the SDV is a pedestrian. As such, the SDV on-board computer will generate a real-time ameliorative action that poses the least risk to the pedestrian, even if that poses an elevated risk of injury to passengers in SDVs 402/412 and damage to SDVs 402/412, since hitting the pedestrian would most likely cause grave bodily injury to the pedestrian.

In an embodiment of the present invention, the object to be imminently collided with by the SDV is a non-human animal. As such, the SDV on-board computer will generate a real-time ameliorative action that does not pose an undue risk to passengers in SDVs 402/412, nearby pedestrians, nearby vehicles when avoiding the non-human animal (e.g., a deer).

In an embodiment of the present invention, the object to be imminently collided with by the SDV is a vehicle that is not an SDV. That is, assume that SDV/vehicle 402 is about to hit vehicle 406 shown in FIG. 4. Assume now that all (or at least most) SDVs broadcast a signal indicating that 1) they are in autonomous mode, and 2) are able to coordinate movements with other SDVs. As such, if vehicle 406 is another SDV, then SDV 402 and vehicle 406 can coordinate their movements in order to avoid hitting one another. However, if vehicle 406 is not an SDV, then the SDV on-board computer 501 in SDV 402 assumes that the course of movement of vehicle 406 will not change quickly enough to avoid the collision, and thus, SDV 402 may have to take all ameliorative steps to minimize the effect of the collision (if not avoiding it entirely).

In an embodiment of the present invention, the object that will imminently collide with the SDV is an inanimate object located in a fixed position (e.g., a tree branch in the middle of the road). As such, the SDV on-board computer 501 determines that this object will not be moving, and generates an ameliorative action that takes this into account (including, if necessary and being the safest alternative, simply allowing SDV 402 to hit the fixed object).

In an embodiment of the present invention, the amelioration action is to strike the object in a manner that causes energy-absorbing areas on the SDV to absorb an impact of the SDV striking the object. For example, if SDV 402 realizes that it cannot avoid hitting an object, it at least will position itself such that the crumple zone 702a takes the main brunt of the collision, thereby protecting the passengers within the passenger section 704 of the SDV 412 shown in FIG. 7.

In an embodiment of the present invention, the amelioration action is to cause at least one tire on the SDV to deflate. For example, assume that SDV 402 is unoccupied. Assume further that SDV 402 is equipped with a tire rupturing system (e.g., tire rupturing system 543 shown in FIG. 5). If SDV on-board computer 501 directs the tire rupturing system 543 to cause one or more tires on the SDV 402 to blow out (rupture), this will result in SDV 402 abruptly slowing down (due to the drag and resistance caused by the ruptured tires).

In an embodiment of the present invention, assume that the SDV is unoccupied. If so, then the amelioration action in this embodiment is to prevent any airbags within the SDV from deploying in response to the SDV colliding with the object. That is, deploying airbags may damage cargo within the SDV, or may simply provide no benefit since there are no passengers (while still incurring the cost of replacement of the deployed airbags). As such, the airbags will be disabled. Note that there still may be a pressure sensor on seats in the SDV. However, the camera will detect that this pressure comes from cargo, not passengers, and will then disable the airbags.

In an embodiment of the present invention, one or more processors determine a weight ratio between the SDV and the object, and then adjust the amelioration action according to the weight ratio between the SDV and the object. For example, assume that SDV 402 is passenger sedan (with passengers on board) that is about to be hit by a fast-moving train (e.g., a train that is going over 60 miles per hour). As such, SDV 402 will take any reasonable step, including hitting another vehicle, hitting a wall, etc., rather than being hit by the fast-moving train, which would certainly be fatal to the occupants of SDV 402.

In an embodiment of the present invention, one or more processors adjust the amelioration action based on roadway conditions for a roadway on which the SDV is traveling. For example, if chemical sensors 527 in FIG. 5 detect the presence of flammable liquids on roadway 404 shown in FIG. 4, then the SDV on-board computer 501 may devise an ameliorative action that avoids driving through the flammable liquids. Similarly, if SDV on-board computer 501 has been alerted of inclement weather on the roadway 404 and/or knows (e.g., from a loaded digital map within the SDV on-board computer 501) that roadway 404 is about to curve sharply within 100 feet, then SDV on-board computer 501 will tailor the ameliorative action in order to accommodate these conditions.

In an embodiment of the present invention, assume that vehicle 402 is a first SDV. One or more processors receive executable instructions for implementing an amelioration action performed by a group of other SDVs that experienced an imminent collision that was similar to the imminent collision being experienced by the first SDV, and then execute the executable instructions for implementing the amelioration action performed by the group of other SDVs. That is, SDV 402 can use ameliorative actions that were taken by other SDVs. Such ameliorative actions can be stored within the SDV on-board computer 501 within SDV 402.

In one or more embodiments of the present invention, SDV 402 can also learn from other SDVs around the same geolocation and context (e.g. road conditions/weather) regarding what decision they have taken and the outcomes of those decisions a priori and apply such lessons when similar situations arise. That is, the SDV on-board computer 501 in SDV 402 can use a probabilistic function to define the best possible option based on the other SDVs and human inputs.

In one or more embodiments of the present invention, a human driver or passenger may be allowed to override the decision of the SDVs 402/412 if time permits.

In an embodiment of the present invention in which SDV 402 is unoccupied, a full-size interior airbag may deploy if the SDV senses that it is about to be in an accident to minimize interior damage. Alternatively, the interior may fill with a fast expanding foam (to protect the interior of the SDV 402) and/or with fire-retarding agents and foams to inhibit explosions and fires. Such actions are not taken if the SDV 402 has people in it.

Thus, as described herein, an SDV (e.g., SDV 412 shown in FIG. 4) "learns" from the experiences of another vehicle, such as vehicle 402, which may be human driven or may be an SDV as well. This other vehicle performs an evasive action, which 1) may or may not have been successful, and 2) may or may not have been appropriate/necessary.

That is, while the present invention has been described thus far as being directed to training an SDV to avoid a collision based on the evasive actions that have been performed on other vehicles, in one or more embodiments of the present invention a determination is made as to whether such an evasive action was actually necessary. That is, the operator (human or computer) of vehicle 402 may perform a certain maneuver that includes harsh braking, rapid acceleration, high-speed turns, etc. In order to determine if such actions were truly necessary to avoid a collision or were simply poor driving/control of the vehicle, an evaluation is made of the roadway conditions and the traffic conditions (as described above) in order to make this determination. For example, if a video shows no evidence of the vehicle about to hit another vehicle, and yet the vehicle makes a sudden swerve, etc., then the system will dismiss this action as not being a legitimate evasive action. Furthermore, a pattern of such driving behavior will cause the system to more closely examine future "evasive actions" that occur when other vehicles are present, in order to ensure that such evasive actions were truly necessary, and thus should be shared in order to train other SDVs.

The present invention may be implemented in one or more embodiments using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
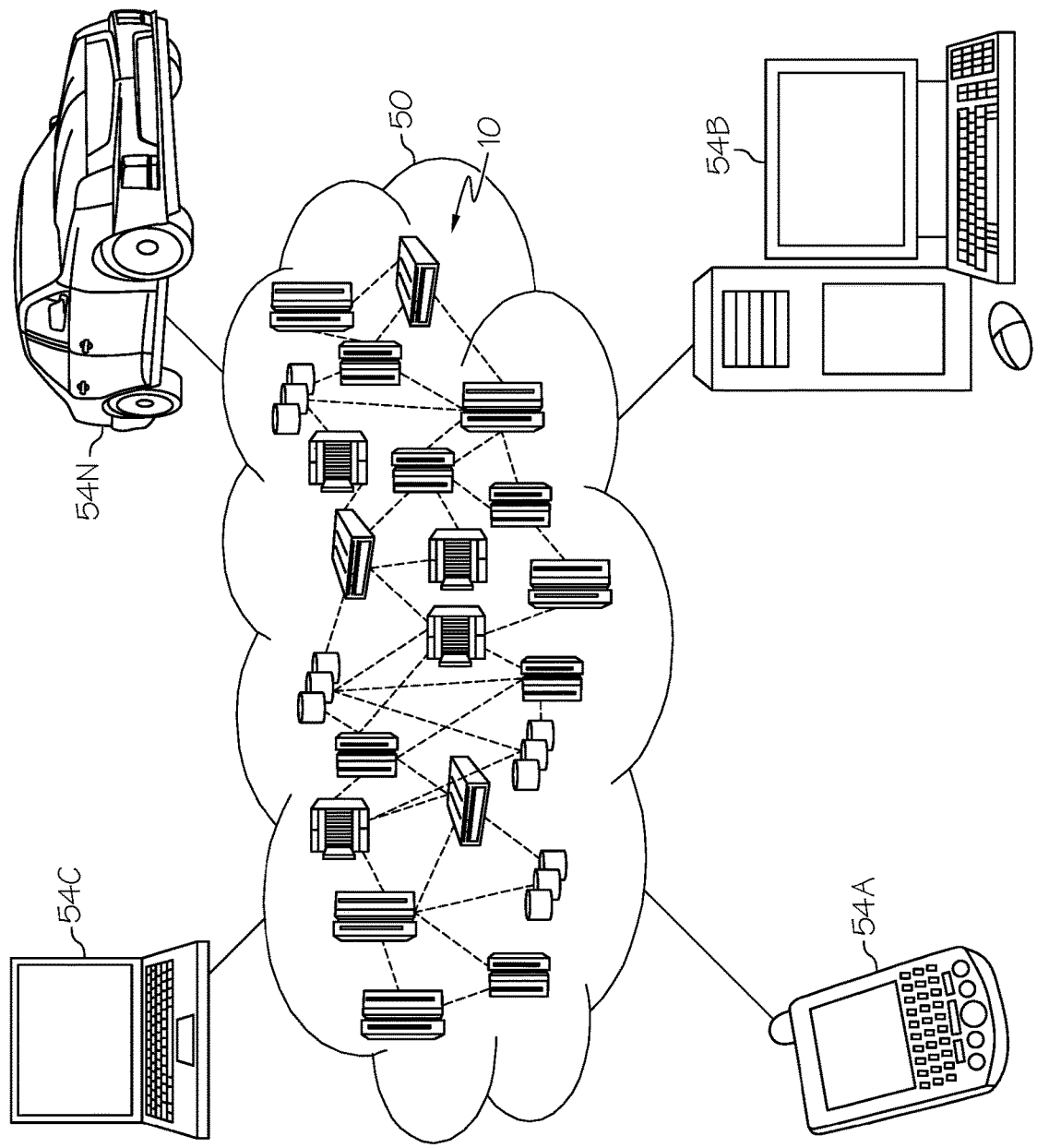
FIG. 9 depicts a cloud computing environment in accordance with one or more embodiments of the present invention.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 9 are intended to be illustrative only and that computing nodes 10 and cloud computing environment 50 can communicate with any type of computerized device over any type of network and/or network addressable connection (e.g., using a web browser).

Figure 10:
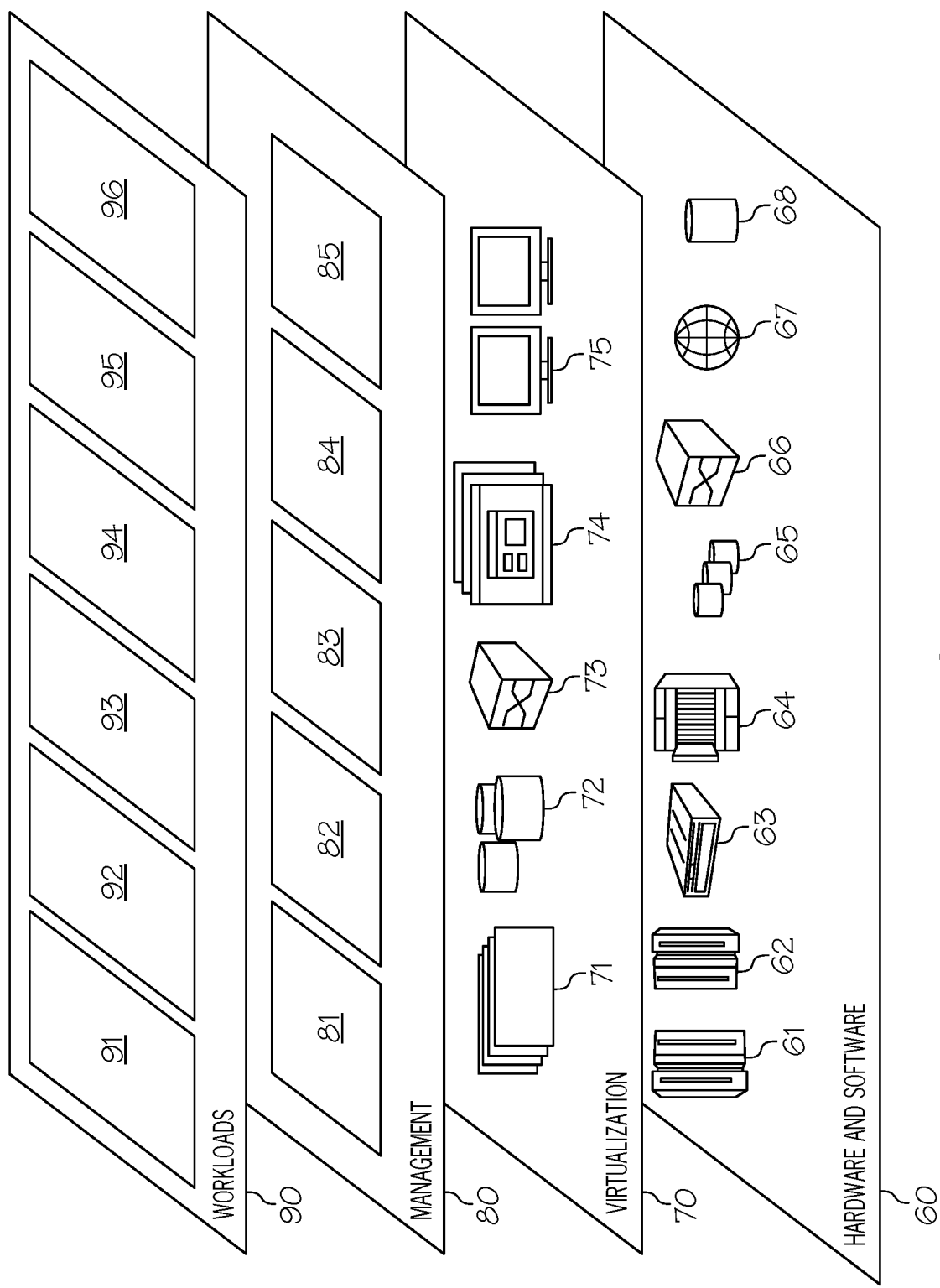
FIG. 10 depicts abstraction model layers of a cloud computing environment, in accordance with one or more embodiments of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and self-driving vehicle training processing 96, which performs one or more workloads and functions in accordance with the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Some embodiments of the present invention may be implemented through the use of a VHDL (VHSIC Hardware Description Language) program in conjunction one or more compatible electronic devices (sometimes referred to as VHDL chip). VHDL is an exemplary design-entry language for electronic devices such as Field Programmable Gate Arrays (FPGAs), Application Specific Integrated Circuits (ASICs), and other devices. By way of further example only, a computer implemented method (embodied in software) be emulated by a hardware-based VHDL program, which is then applied to a VHDL chip, such as a FPGA.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method comprising:
   detecting, by a self-driving vehicle (SDV) on-board computer on an SDV, a roadway hazard on a roadway upon which the SDV is traveling, wherein the SDV contains no passengers nor a human driver, and wherein the SDV on-board computer controls the SDV;
   identifying, by the SDV on-board computer, a first evasive maneuver that moves the SDV into a position that protects one or more other vehicles from colliding with the roadway hazard; and
   executing, by the SDV on-board computer, the first evasive maneuver in order to move the SDV into the position that protects the one or more other vehicles from colliding with the roadway hazard.

2. The computer-implemented method of claim 1, wherein the one or more of the other vehicles are other self-driving vehicles (SDVs), and wherein the computer-implemented method further comprises:
 creating, by the computer, a second evasive maneuver for the other SDVs to avoid the roadway hazard;
 determining, by the computer, that the second evasive maneuver would be unsuccessful in avoiding the roadway hazard; and
 in response to determining that the second evasive maneuver would be unsuccessful in avoiding the roadway hazard, blocking transmission of the second evasive maneuver to the one or more other SDVs.

3. The computer-implemented method of claim 1, wherein the roadway hazard is from a group consisting of:
 a multiple vehicle collision;
 a second vehicle proximate to the SDV at a time of the first evasive maneuver; and
 a fixed obstruction on the roadway.

4. The computer-implemented method of claim 1, wherein the SDV is a first SDV, wherein the one or more other vehicles are other self-driving vehicles (SDVs), and wherein the computer-implemented method further comprises:
 determining that a second evasive maneuver would be unsuccessful in avoiding the roadway hazard experienced by the first SDV if executed by the first SDV; and
 in response to determining that the second evasive maneuver would be unsuccessful in avoiding the roadway hazard experienced by the first SDV if executed by the first SDV, transmitting, to the one or more other SDVs, the second evasive maneuver along with explicit directions to not use the second evasive maneuver if confronted with the roadway hazard experienced by the first SDV.

5. The computer-implemented method of claim 1, further comprising:
 detecting, by one or more processors, that an imminent collision by the SDV is imminent with a confidence C1, wherein a confidence level of C1 is less than 100%;
 determining, by one or more processors, whether the SDV has one or more occupants with a confidence C2, wherein a confidence level of C2 is less than 100%;
 identifying, by one or more processors, a type of object with which the imminent collision by the SDV is imminent with a confidence C3, wherein a confidence level of C3 is less than 100%;
 generating, by one or more processors, an ameliorative action for the SDV based on C1, C2, C3; and
 directing the SDV on-board processor to execute the ameliorative action.

6. The computer-implemented method of claim 5, further comprising:
 determining, by one or more processors, confidence C1 based on an analysis of sensor data received in real-time from one or more sensors on the SDV.

7. The computer-implemented method of claim 1, wherein the SDV has one or more crumple zones, wherein the one or more crumple zones are constructed of material that is specifically designed to absorb and dissipate crash energy, and wherein the computer-implemented method further comprises:
 directing the SDV on-board processor to maneuver the SDV such that the one or more other vehicles will strike the one or more crumple zones of the SDV rather than colliding with the roadway hazard.

8. The computer-implemented method of claim 1, wherein the first evasive maneuver further comprises causing at least one tire on the SDV to deflate.

9. A computer program product, the computer program product comprising a computer readable storage medium having program instructions embodied therewith, the program instructions readable and executable by a processor to cause the processor to:
 detect a roadway hazard on a roadway upon which a self-driving vehicle (SDV) is traveling, wherein the SDV contains no passengers nor a human driver, and wherein an SDV on-board computer controls the SDV;
 identify an evasive maneuver that moves the SDV into a position that protects one or more other vehicles from colliding with the roadway hazard; and
 execute the evasive maneuver in order to move the SDV into the position that protects the one or more other vehicles from colliding with the roadway hazard.

10. The computer-implemented method of claim 1, wherein the SDV on-board computer includes a neural network, and wherein the computer-implemented method further comprises:
 inputting training data into the neural network in order to train the neural network to generate a prediction of the roadway hazard at one or more locations, wherein the training data represents multiple views previously detected by an image detection system from multiple drives through the one or more locations; and
 utilizing the prediction of the roadway hazard to cause execution of the first evasive maneuver.

11. A system comprising:
 one or more processors;
 one or more computer readable memories operably coupled to the one or more processors; one or more computer readable storage mediums operably coupled to the one or more computer readable memories; and
 program instructions stored on at least one of the one or more computer readable storage mediums for execution by at least one of the one or more processors via at least one of the one or more computer readable memories, the program instructions comprising:
 program instructions to detect a roadway hazard on a roadway upon which a self-driving vehicle (SDV) is traveling, wherein the SDV contains no passengers nor a human driver, and wherein an SDV on-board computer controls the SDV;
 program instructions to identify an evasive maneuver that moves the SDV into a position that protects one or more other vehicles from colliding with the roadway hazard; and
 program instructions to execute the evasive maneuver in order to move the SDV into the position that protects the one or more other vehicles from colliding with the roadway hazard.

12. The computer-implemented method of claim 1, further comprising:
 detecting, by a chemical sensor on the SDV, a presence of a flammable liquid on the roadway; and
 adjusting the first evasive maneuver to cause the SDV to avoid driving through the flammable liquid.

\* \* \* \* \*